(12) United States Patent
Ait-Ameur

(10) Patent No.: US 8,345,700 B2
(45) Date of Patent: *Jan. 1, 2013

(54) EMBEDDING OF MPLS LABELS IN IP ADDRESS FIELDS

(75) Inventor: Samir Ait-Ameur, Fremont, CA (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 352 days.

This patent is subject to a terminal disclaimer.

(21) Appl. No.: 12/640,940

(22) Filed: Dec. 17, 2009

(65) Prior Publication Data

US 2011/0149962 A1 Jun. 23, 2011

(51) Int. Cl.
*H04L 12/56* (2006.01)
*H04J 3/24* (2006.01)

(52) U.S. Cl. ........ 370/409; 370/474

(58) Field of Classification Search ........ 370/392, 370/393, 409, 474

See application file for complete search history.

(56) References Cited

U.S. PATENT DOCUMENTS

| 7,937,438 B1* | 5/2011 | Miller et al. ............ 709/203 |
| 2004/0179508 A1* | 9/2004 | Thubert et al. ........... 370/349 |
| 2006/0002370 A1* | 1/2006 | Rabie et al. ............. 370/351 |
| 2006/0120382 A1* | 6/2006 | Thubert et al. ........ 370/395.52 |
| 2007/0127474 A1* | 6/2007 | Mirtorabi et al. ......... 370/390 |
| 2008/0002699 A1* | 1/2008 | Rajsic ................... 370/392 |

OTHER PUBLICATIONS

D. Eastlake, "RFC 5342: IANA Considerations and IETF Protocol Usage for IEEE 802 Parameters," Sep. 2008, Network Working Group, p. 1-22.*

* cited by examiner

*Primary Examiner* — Man Phan
*Assistant Examiner* — Ryan Kavleski

(57) ABSTRACT

MPLS labels may be inserted in IPv6 source or destination IP address fields, potentially reducing network overhead bandwidth. In one implementation, a network device may receive a packet; determine whether the packet is an ingress packet for a MPLS LSP; determine an MPLS label for the packet when the packet is an ingress packet; insert the MPLS label in a portion of a source IP address field or a destination IP address field of the packet, when the packet is an ingress packet; and output the packet to the LSP.

19 Claims, 9 Drawing Sheets

EMBEDDING OF MPLS LABELS IN IP ADDRESS FIELDS

BACKGROUND

In an increasingly networked world, more and more traffic, such as data, voice, and video, is transmitted over public and proprietary networks. When routing traffic through the network, it is desirable to be able to assign different types of traffic different priorities as the traffic traverses the network. Some applications require stringent limits on end-to-end traffic delay while other applications require minimal bandwidth guarantees.

One technique for transmitting data through a network is multiprotocol label switching (MPLS). In an MPLS network, data packets are assigned labels. Packet-forwarding decisions may be made solely on the contents of the labels, without the need to examine the packet itself. With this technique, end-to-end circuits can be created over the network using a number of types of transport media or protocols.

In general, MPLS functions by prefixing packets with a 32-bit MPLS header. These MPLS-labeled packets are switched at network devices after a "label lookup" that defines the next destination hop for the MPLS-packet based on the label. One disadvantage of MPLS, however, is that the MPLS labels add additional bandwidth overhead to network communications.

DETAILED DESCRIPTION

The following detailed description refers to the accompanying drawings. The same reference numbers in different drawings may identify the same or similar elements. Also, the following detailed description does not limit the invention.

The term "packet," as used herein, may refer to a packet, a datagram, a frame, or a cell; a fragment of a packet, a fragment of a datagram, a fragment of a frame, a fragment of a cell; or another type, arrangement, or packaging of data.

Implementations described herein may include systems and/or methods that provide for the use of MPLS with IPv6 (Internet Protocol version 6) using a technique that can reduce the overhead bandwidth over the label-switched paths. More particularly, the MPLS label for a packet may be embedded in either the source or destination IPv6 address field of the packet. Edge devices on the MPLS network, such as label edge routers (LERs) or other network devices, may coordinate with one another to store the MPLS label in the IPv6 addresses in such a way so that IPv6 address information is not lost.

Figure 1:
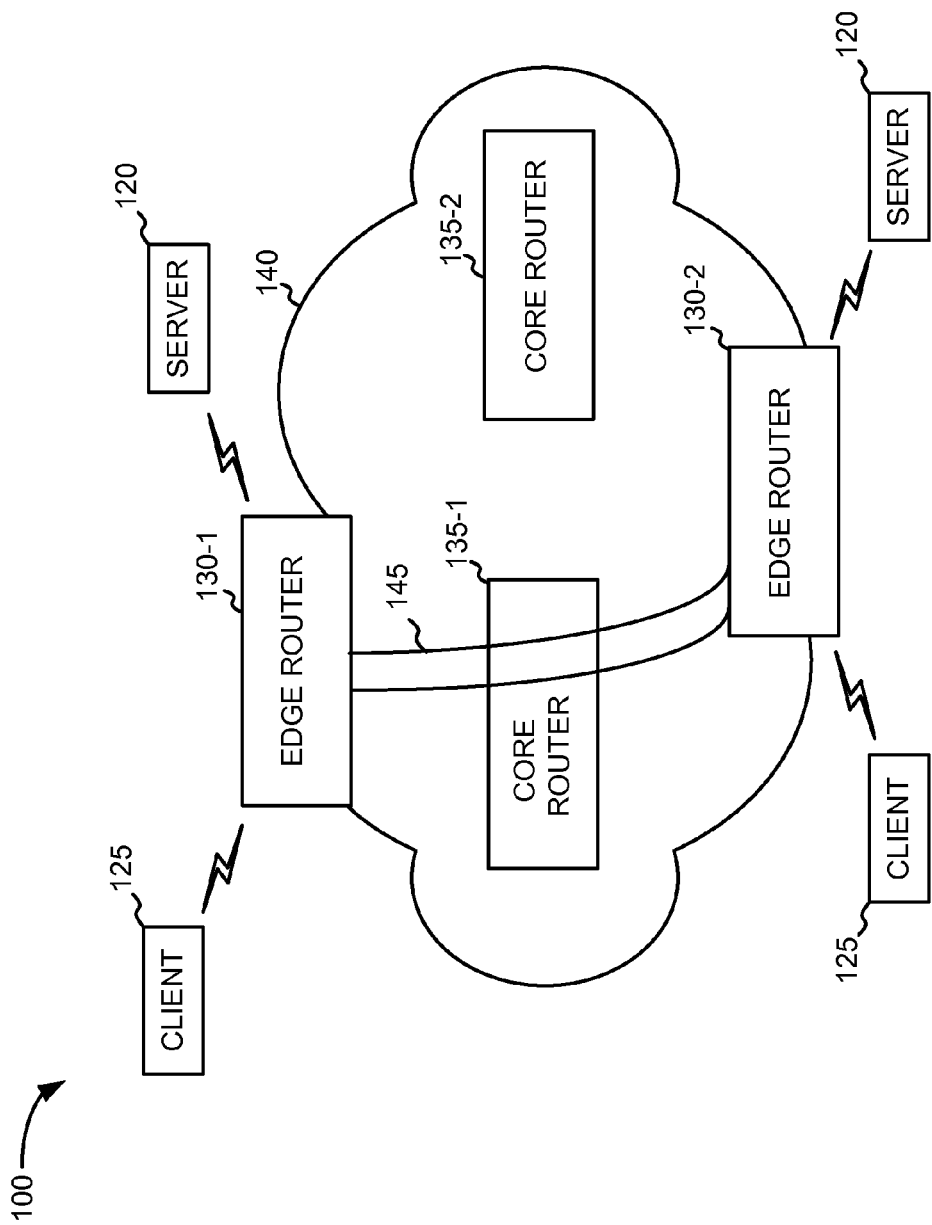
FIG. 1 is a diagram of an exemplary environment in which concepts described herein may be implemented.

FIG. 1 is a diagram of an exemplary environment 100 in which concepts described herein may be implemented. Environment 100 may include multiple entities, such as one or more servers 120 and one or more clients 125. Servers 120 may include one or more computing devices designed to provide information to or otherwise interact with clients 125. Similarly, clients 125 may each include one or more computing devices designed to interact with and obtain content from servers 120 or with other clients 125.

Servers 120 and clients 125 and may communicate via a network 140. Network 140 may include a wide area network (WAN), such as the Internet, a private WAN, or a combination of the Internet and a private WAN, that is used to transport data to servers 120 and clients 125.

Network 140 may include a number of network devices, such as edge routers 130-1 and 130-2, and core routers 135-1 and 135-2. Edge routers 130 may generally function to connect devices, such as clients 125 or servers 120 to network 140. Core routers 135 may function to transmit data between other routers within network 140. In addition to simply routing data, edge routers 130 and core routers 135 may support other "value added" functions, such as quality of service (QoS) features and specialized security functions, such as IPsec (IP security) encryption.

Edge routers 130 may particularly be label edge routers (LERs) that can implement edges (i.e., ingress and egress points) for MPLS links, called label switched paths (LSPs). Edge routers 130 may push and pop MPLS labels from incoming and outgoing packets to begin and terminate each LSP. One LSP, LSP 145, is particularly shown in FIG. 1. As shown, LSP 145 may include edge router 130-1, core router 135-1, and edge router 130-2. Incoming (ingress) packets may be received at edge router 130-1, which may pre-append (push) an MPLS label onto the packet. The packet may then be switched through network 140 based on the label. Edge router 130-2 may act as the egress point for LSP 145. Edge router 130-2 may remove (pop) the MPLS label from the packet before forwarding the packet to client 125 or server 120.

Although, FIG. 1 illustrates exemplary components of environment 100, in other implementations, environment 100 may include additional, fewer, different, or differently arranged components than those illustrated in FIG. 1 and described herein. For example, although described in the context of edge routers 130 and core routers 135, it should be understood that in other implementations, other network devices may be included in environment 100. Other network devices may include, for example, a gateway, a switch, a firewall, a network interface card (NIC), a hub, a bridge, a proxy server, or an optical add-drop multiplexer (OADM).

Figure 2:
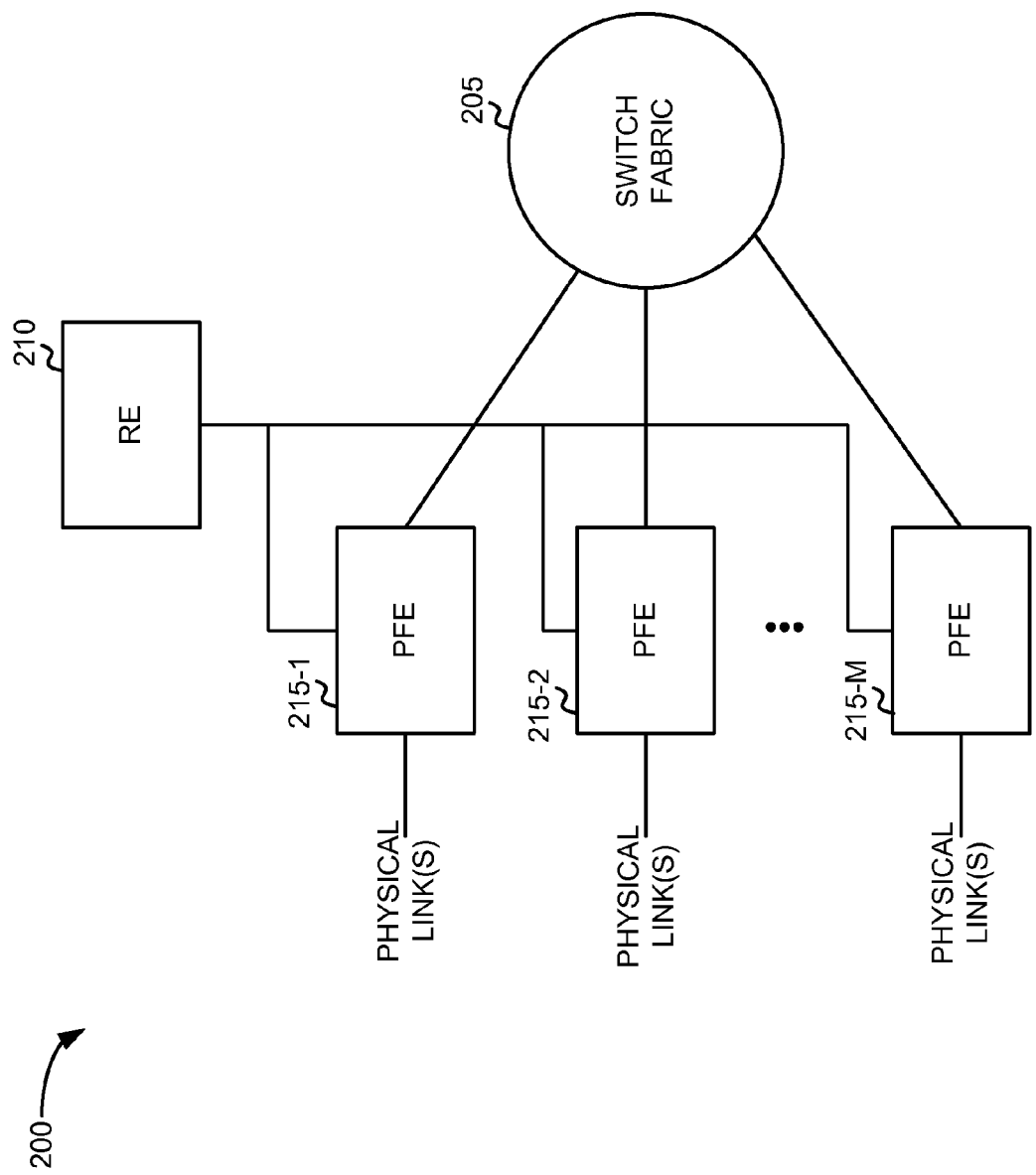
FIG. 2 is a diagram illustrating exemplary components of a network device.

FIG. 2 is a diagram illustrating exemplary components of a network device 200. Network device 200 may correspond to, for example, one or more of edge routers 130 or core routers 135. As illustrated in FIG. 2, network device 200 may include an internal switch fabric 205, a routing engine (RE) 210, and packet forwarding engines (PFEs) 215-1 through 215-M (collectively referred to as PFEs 215). Network device 200 may receive data from physical links, process the data to determine destination information, and transmit the data out on a link in accordance with the destination information.

RE 210 may perform high level management functions for network device 200. For example, RE 210 may communicate with other networks and systems connected to network device 200 to exchange information regarding network topology. RE 210 may create routing tables based on the network topology information and forward the routing tables to PFEs 215. PFEs 215 may use the routing tables to perform route lookup for incoming data. RE 210 may also perform other general control and monitoring functions for network device 200.

PFEs 215 may each connect to each other via switch fabric 205. Switch fabric 205 may provide internal links between different PFEs 215. In general, PFEs 215 may receive data on ports connecting physical links that lead to network 140. Each physical link could be one of many types of transport media, such as optical fiber or Ethernet cable. The data on the physical link may be formatted according to one of several protocols, such as the synchronous optical network (SONET) standard. PFEs 215 may process the received data, determine the correct output port for the data, and transmit the data on the physical link corresponding to the determined output port.

Although network device 200 is described above as corresponding to an edge router 130 or core router 135, in other implementations, network device 200 may generally be implemented as a router or switch that performs other functions in network 140. Network device 200 may also potentially be implemented as a device installed locally at a location of client 125 or server 120.

Packets traversing a network, such as network 140, may be assigned to various priority classes and then allocated bandwidth differently based on the priority classes. For IP packets, the IP header portion of the packet may be set to indicate the priority level of the packet. Network device 200 may analyze the IP header portion of the packet to determine the priority for a packet. For example, the header of a packet may contain a Type of Service (TOS) field that includes bits that may be based on the priority level of the packet. MPLS switching decisions may also be based on the IP header portion of the packet.

Although FIG. 2 illustrates exemplary components of network device 200, in other implementations, network device 200 may include additional, fewer, different, or differently arranged components than those illustrated in FIG. 2 and described herein. Additionally, or alternatively, one or more operations described as being performed by a particular component of network device 200 may be performed by one or more other components, in addition to or instead of the particular component.

Figure 3A:
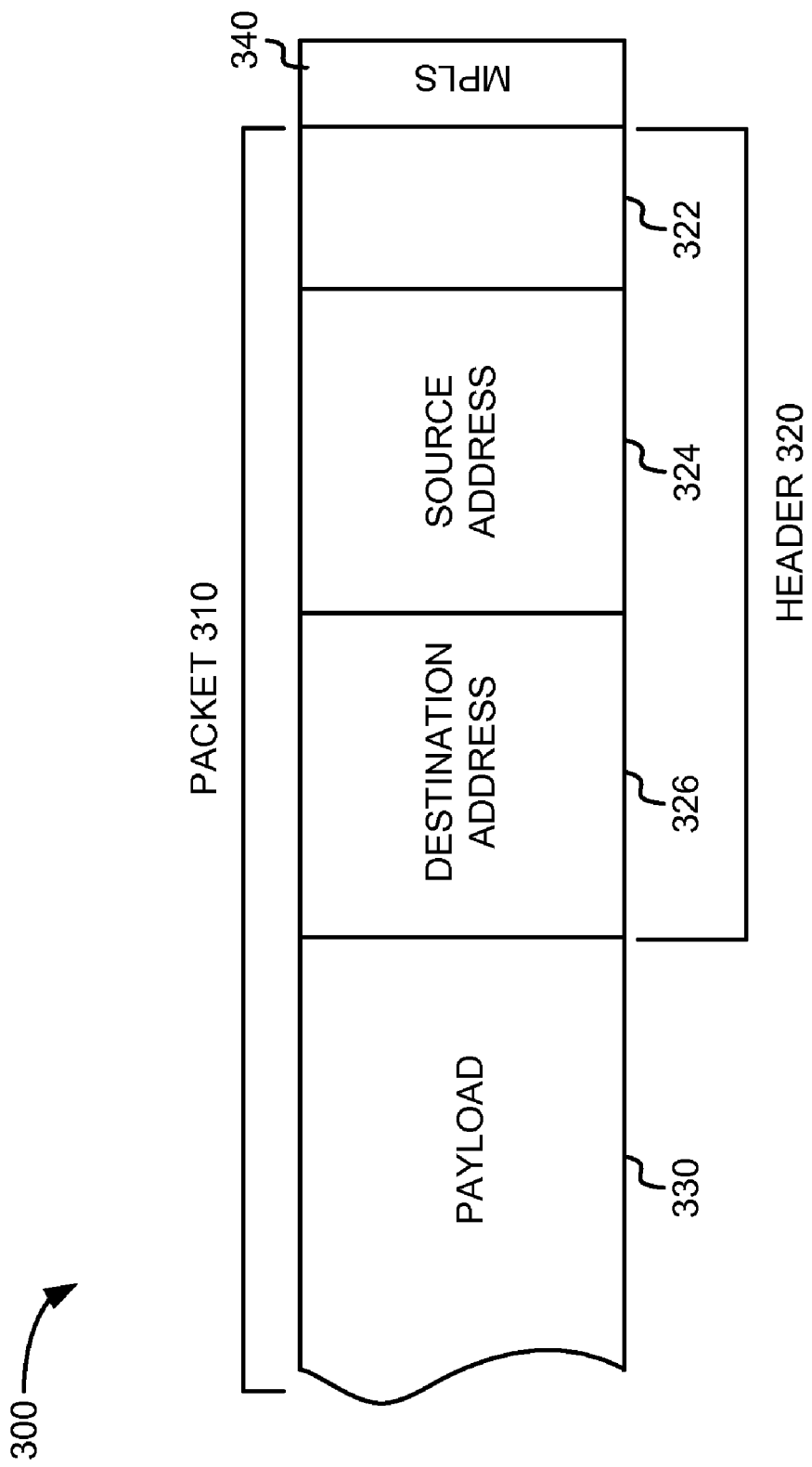
FIGS. 3A-3D are diagrams illustrating formats of MPLS packets.

FIG. 3A is a diagram illustrating the format of an MPLS packet 300 as conventionally implemented. MPLS packet 300 may include the original packet 310, which may be an IPv6 packet, pre-appended with MPLS label 340. MPLS label 340 may be a 32-bit field that includes a 20-bit label value field, a 3-bit traffic class field, 1-bit bottom of stack flag, and an 8-bit time-to-live (TTL) field.

Packet 310 may include the IPv6 packet as received at the ingress edge router 130. Packet 310 may generally include a header portion 320 and a payload portion 330. Header portion 320 may include control information used to deliver the payload data to its final destination. Header portion 320 may particularly include initial fields 322, which may be a 64-bit value that includes version field, a traffic class field, a flow label field, a payload length field, a next header field, and a hop limit field. Source address field 324 and destination address field 326 may include 128-bit destination addresses. A 128-bit field can theoretically define $2^{128}$ (i.e., 340 trillion trillion trillion) unique addresses. Payload 330 may include the payload for the packet. Payload 330 may be a variable length field.

Consistent with aspects described herein, a packet that includes an MPLS label 340 may be constructed so that the MPLS label 340 is embedded within source address 324, destination address 326, or both. Accordingly, the size of the packet can be reduced, potentially improving the useful bandwidth of network 140.

Figure 3B:
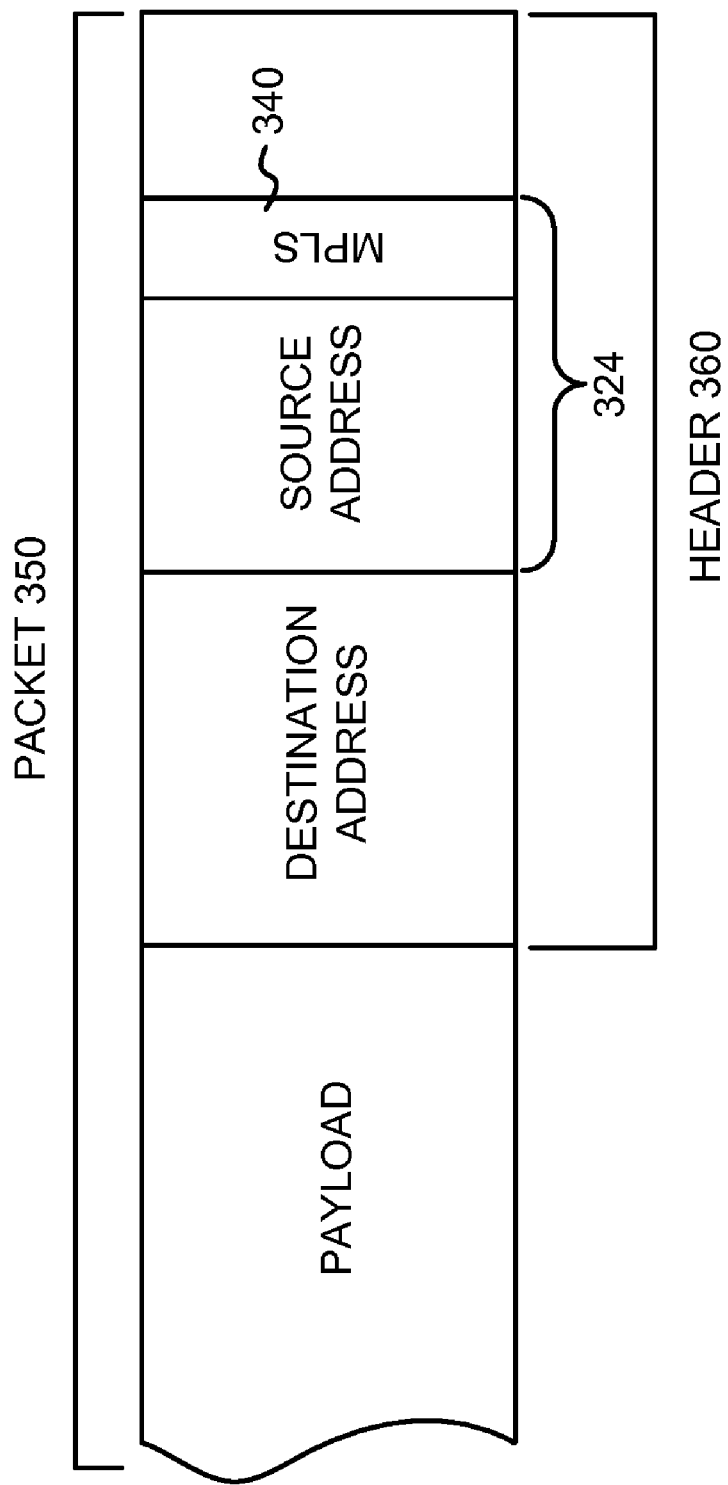
Figure 3C:
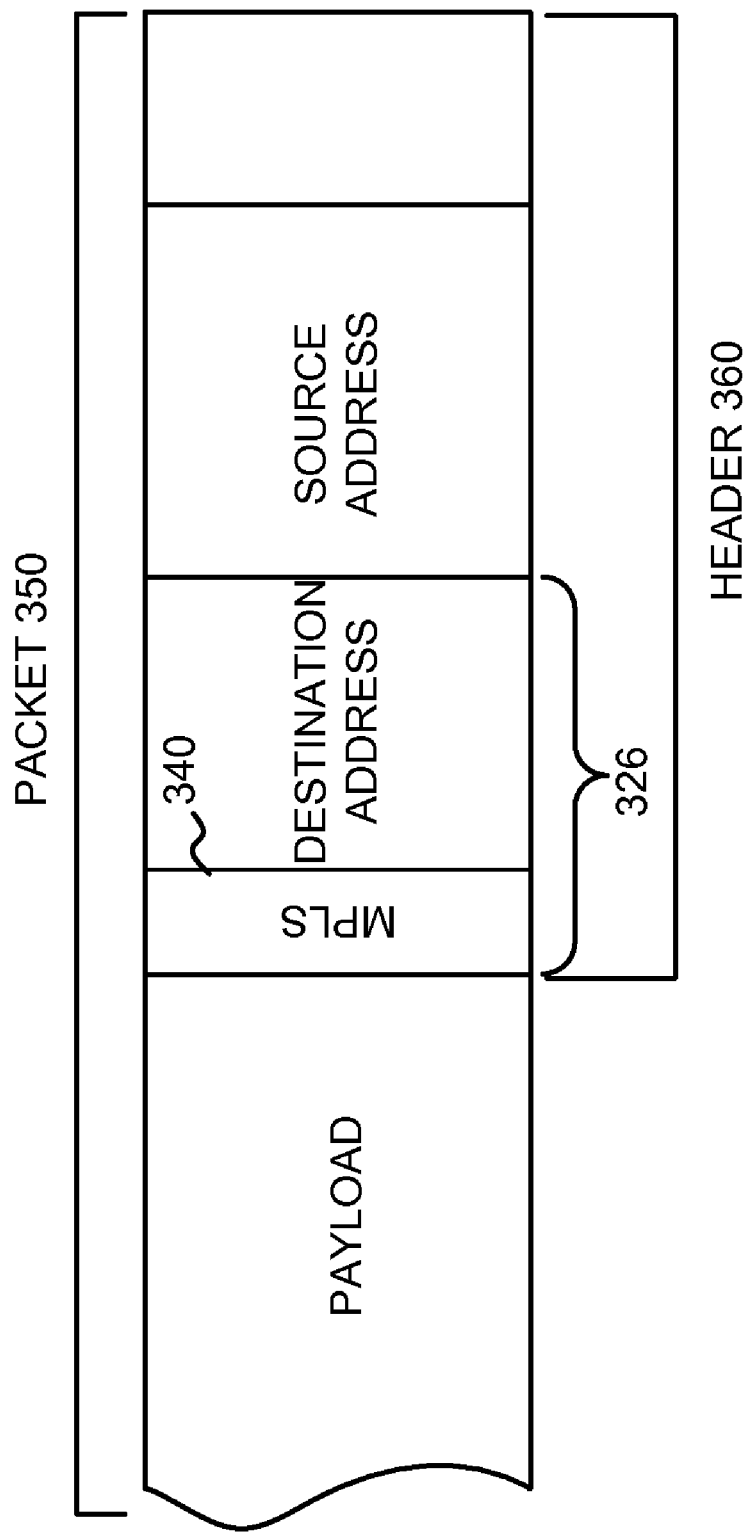
Figure 3D:
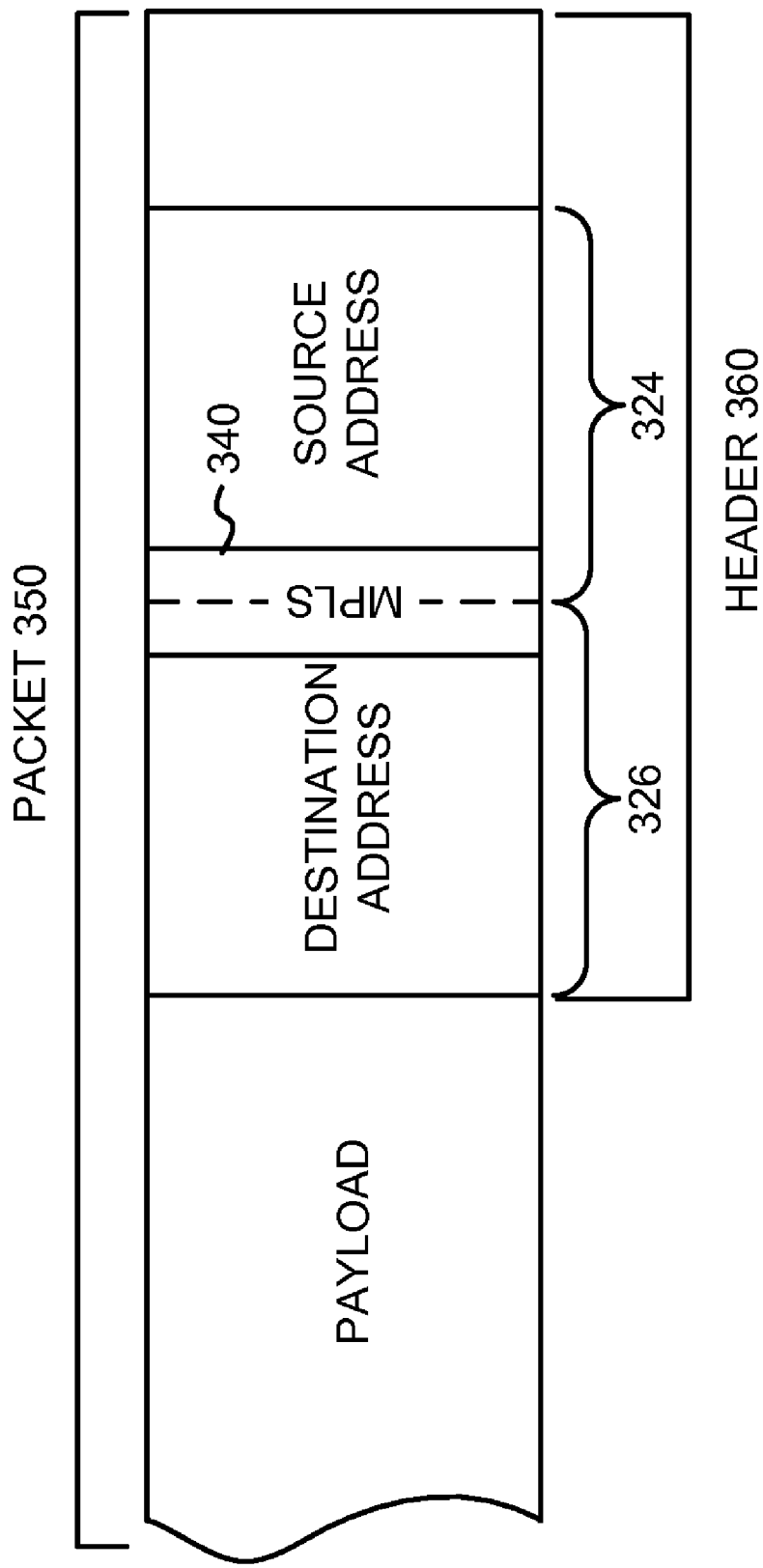

FIGS. 3B-3C are diagrams illustrating an exemplary MPLS packet formatted consistently with aspects described herein. As shown in FIG. 3B, a packet 350 includes header 360 in which MPLS label 340 is embedded in the source address field 324. Alternatively, as shown in FIG. 3C, packet 350 includes header 360 in which MPLS label 340 is embedded in destination address field 326. In FIG. 3D, packet 350 includes header 360 in which MPLS label 340 is placed in both the source and destination address fields 324 and 326. For example, MPLS label 340 may be equally split in which 16 bits are stored in the source address field and 16 bits are stored in the destination address field.

Figure 4:
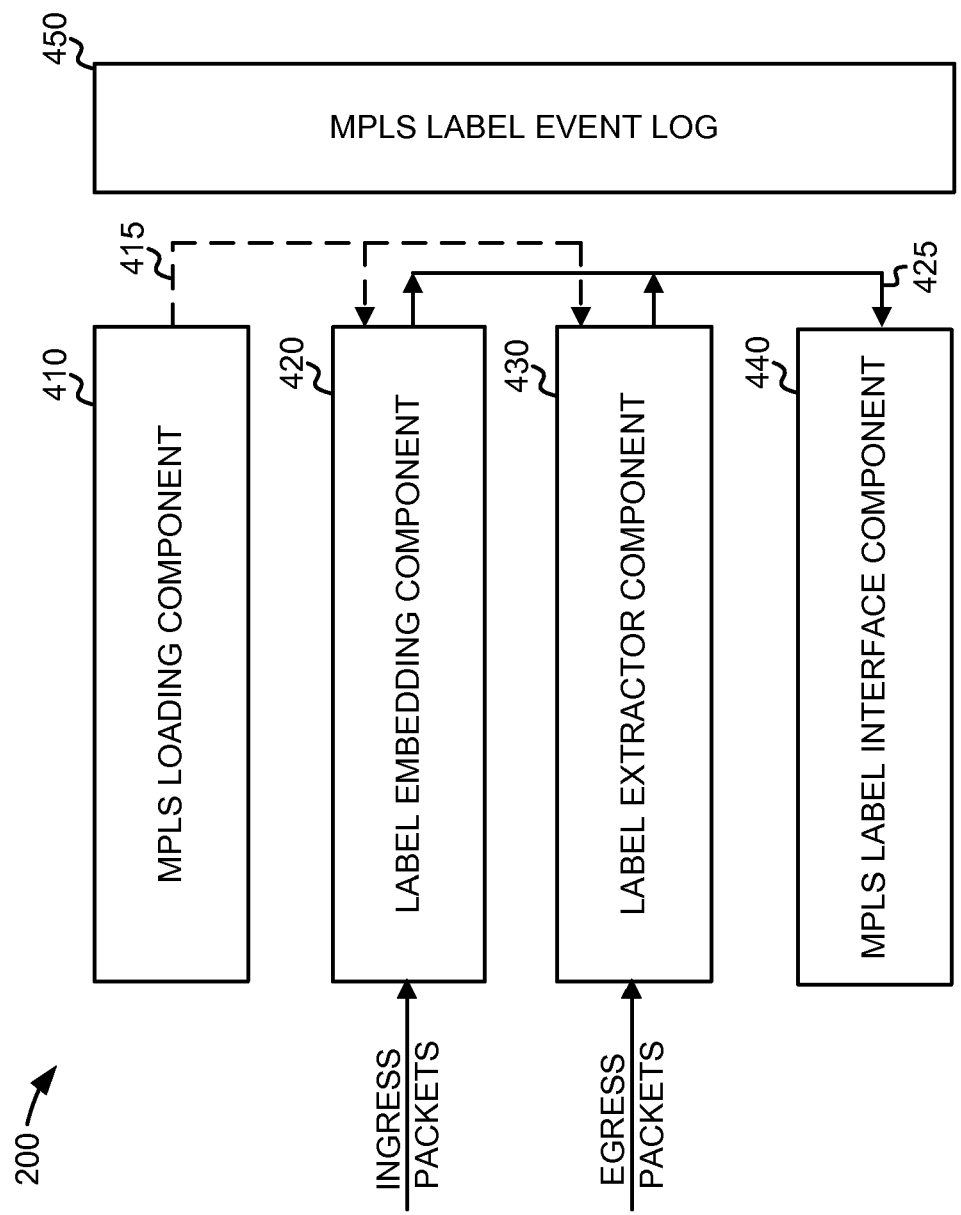
FIG. 4 is a diagram illustrating exemplary the functional components in a network device.

FIG. 4 is a diagram illustrating exemplary functional components of a network device. In practice, the elements shown in FIG. 4 may be implemented in, for example, each of PFEs 215 and RE 210 of a network device 200 acting as a LER. The functional components illustrated in FIG. 4 may be implemented by hardware (e.g., one or more processors or other processing logic, and one or more memories) or a combination of hardware and software in network device 200.

As shown in FIG. 4, network device 200 may include an MPLS loading component 410, a label embedding component 420, a label extractor component 430, an MPLS label interface component 440, and MPLS label event log 450.

MPLS loading component 410 may receive or load new MPLS labels that are to be used in a network, such as network 410. A network administrator may, for example, set up MPLS label switched paths (LSPs) in network 410 for a variety of purposes, such as to create network-based IP Virtual Private Networks or to route traffic along specified paths through network 410. Labels may be distributed in network 410 to edge routers 130 and core routers 135 using a protocol such as the Label Distribution Protocol (LDP). For example, MPLS loading component 410 of an edge router 130 may exchange label and reachability information with other edge routers 130 using LDP in order to build a complete picture of network 410. Labels received or loaded by MPLS loading component 410 may be forwarded to label embedding component 420 and MPLS label extractor component 430, as illustrated by dashed control lines 415.

Label embedding component 420 may identify packets as being ingress packets for a LSP and may insert appropriate labels, such as MPLS labels received from MPLS loading component 410, into the packets. Label embedding component 420 may append the MPLS label to packets as part of the packet's IP source or destination address. Label embedding component 420 may output packet headers, including embedded MPLS labels, to MPLS label interface component 440, as illustrated by control lines 425.

Label extractor component 430 may parse the source and destination addresses in received packets and may remove previously inserted MPLS labels from the source or destination address. MPLS label extractor component 430 may "repair" the source or destination address used to hold the MPLS label so that the source and destination addresses match the original address for the packet (i.e., the address that would be included in the source/destination address fields if the MPLS label had been pre-pended to the packet instead of inserted into the source/destination address fields). Label extractor component 430 may output packets or packet headers with "repaired" source or destination address fields to MPLS label interface component 440, as illustrated by control lines 425.

MPLS label interface component 440 may provide an interface for the packets received from label embedding component 420 or label extractor component 430. MPLS label interface component 440 may represent, for example, a port or other output link for a network device. Alternatively, MPLS label interface component 440 may represent an interface for a next processing section within a network device 200.

MPLS label event log 450 may include one or more computer-readable media in which events at MPLS loading component 410, label embedding component 420, label extractor component 430, and/or MPLS label interface component 440 may be logged. The logged events may be viewed and analyzed by network administrators or the network device. MPLS label event log 450 may be used, for example, to implement troubleshooting of network device 200 or for other reasons in which a record of the activities of network device 200 may be needed. A computer-readable medium may be defined as a physical or logical memory device. A logical memory device may include memory space within a single physical memory device or spread across multiple physical memory devices.

Although FIG. 4 shows exemplary functional components of network device 200, in other implementations, network device 200 may contain fewer, different, differently arranged, or additional functional components than depicted in FIG. 4. Additionally, or alternatively, one or more functional components of network device 200 may perform one or more other tasks described as being performed by one or more other functional components of network device 200.

Figure 5:
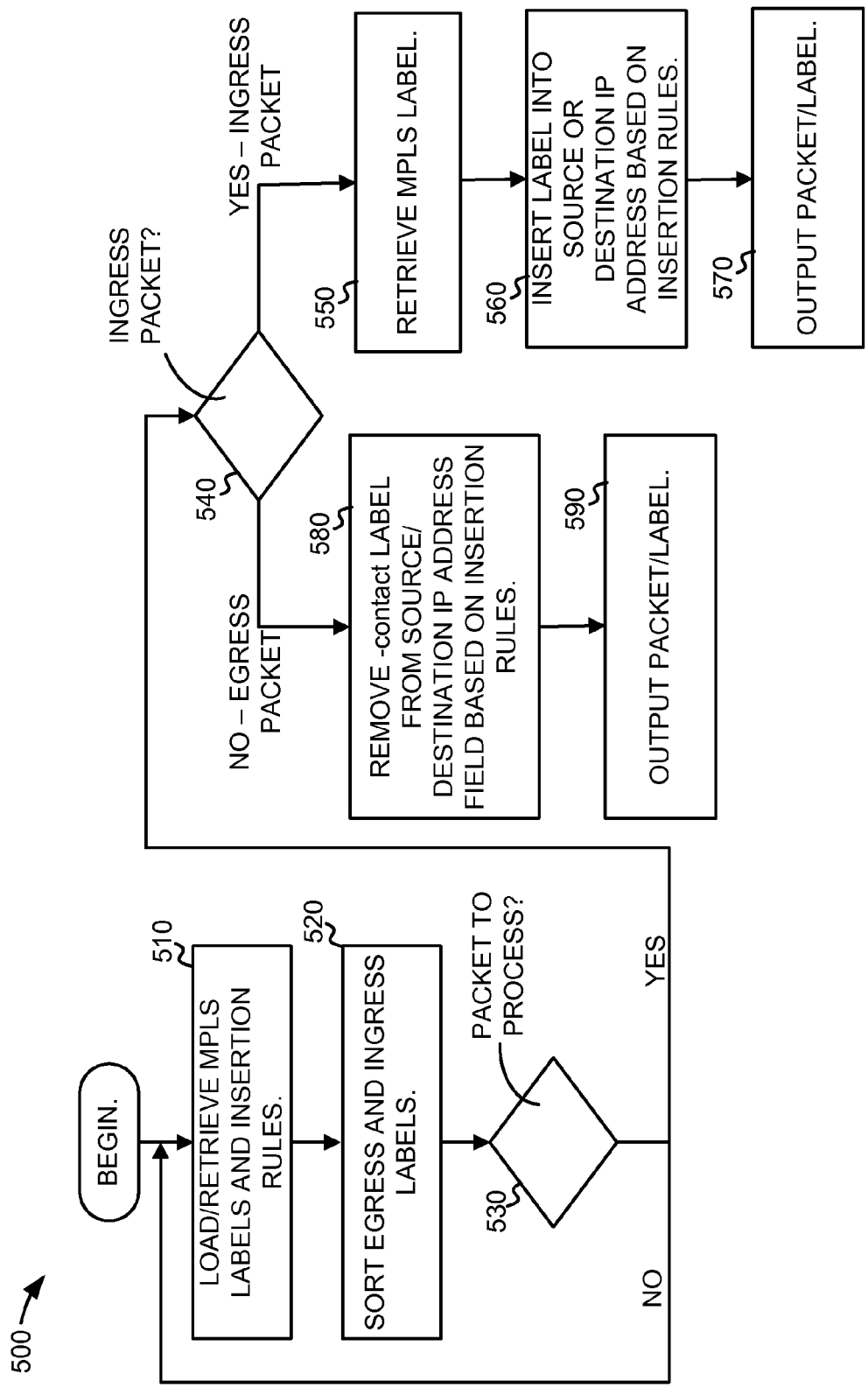
FIG. 5 is a diagram illustrating an exemplary process for embedding and extracting MPLS labels in source or destination address fields of an IPv6 packet.

FIG. 5 is a diagram illustrating an exemplary process 500 for embedding and extracting MPLS labels in source or destination address fields of an IPv6 packet. Process 500 may be performed by one or more components of network device 200. For example, port MPLS loading component 410, label embedding component 420, label extractor component 430, and MPLS label interface component 440 may collectively implement process 500.

Process 500 may begin by loading or retrieving MPLS labels and insertion rules (block 510). The labels may include the MPLS labels that are to be used to identify each LSP in network 410. As previously mentioned, a network administrator may, for example, set up MPLS label switched paths (LSPs) in network 410 to create network-based IP Virtual Private Networks or to route traffic along specified paths through network 410. Labels may be distributed in network 410 to edge routers 130 and core routers 135 using a protocol such as the LDP. MPLS loading component 410 may, for example, present an interface, such as a command line interface, to administrators, through which the administrators can configure the desired MPLS labels and LSPs in network 410. MPLS loading component 410 may also implement MPLS discovery protocols, such as LDP.

The insertion rules loaded or retrieved in block 510 may relate to rules or protocols that define how MPLS labels will be inserted and extracted from the destination or source IPv6 address fields. In one implementation, the insertion rules may be manually configured by a network administrator. The network administrator may configure the insertion rules at each edge router 130 that may modify the MPLS labels or, in some implementations, different edge routers 130 may automatically distribute the insertion rules to other edge routers using a network discovery protocol. In other possible implementations, edge routers 130 may automatically agree on the insertion rules based on the status of network 140 or the insertion rules may be pre-programmed into each edge router 130 that acts as a LER. In general, the insertion rules at each edge router 130 should be consistent with one another.

The insertion rules may define the location at which the MPLS labels are inserted into the source and destination address fields, the encoding of the inserted MPLS labels (if any), and the encoding of the source and destination address fields (if any). The insertion rules may also define, for example, which labels are to be processed by embedding and extracting the labels in source or destination address fields. Other labels may be conventionally processed, i.e., by prepending the label to the IPv6 packet.

Figure 6:
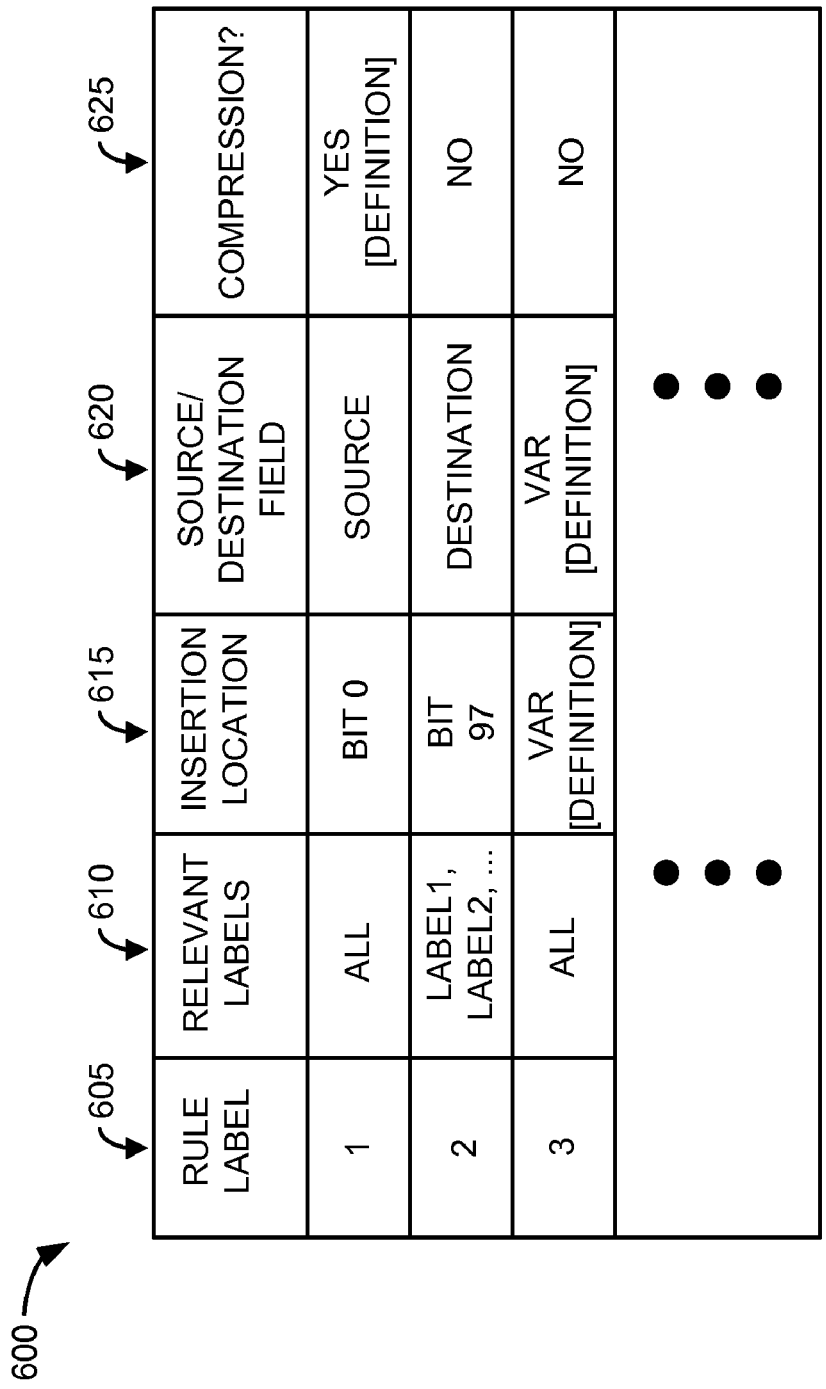
FIG. 6 is a diagram of a table illustrating exemplary insertion rules that may be defined for MPLS labels.

FIG. 6 is a diagram of a table 600, such as a table stored in computer-readable media of network devices 200, illustrating exemplary insertion rules that may be defined for MPLS labels. Each row of table 600 may correspond to an insertion rule that may be used by network devices 200. Each row includes a rule label field 605, a relevant labels field 610, an insertion location field 615, a source/destination field 620, and a compression field 625.

Rule label field 605 may store a key or label used to identify the rule. In FIG. 6, increasing numeric labels (1, 2, 3) are illustrated. Other labels could alternatively be used.

Relevant labels field 610 may define the particular MPLS labels to which the rule applies. For example, rule 1 is relevant to "ALL" labels, indicating that, when this rule is enabled, all MPLS labels received by network device 200 are to be processed based on this rule. Rule 2 includes a list of MPLS labels to which the rule applies. This may indicate that when this rule is enabled, only MPLS labels that match the labels in relevant labels field 610 will be processed according to this rule. Other MPLS labels may be processed according to other rules or based on conventional MPLS label processing.

Insertion location field 615 may indicate the location within the IPv6 address or source field that the MPLS label is to embedded. This field may be defined with, for example, a bit position value. Rule 1, for example, indicates that the MPLS field is to be inserted at bit zero while rule 2 indicates that the MPLS field is to be inserted at bit 97. Rule 3 indicates that the insertion location is variable (VAR). This may mean that the insertion location may change based on the packet or based on other information, such as the network state. The particular location to use may be defined based on a deterministic technique, labeled as "[DEFINITION]" in FIG. 6. This may indicate that the particular technique to use may be defined or referenced in field 615. As one example of such a deterministic technique, consider an insertion procedure in which the MPLS label may be inserted at either bit zero or bit 96 of an IPv6 address field. Network device 200 may determine which of these locations the MPLS label is actually inserted at by, for example, examining each of the possible positions and determining whether a valid label is included in the possible positions.

Source/destination field 620 may indicate whether the MPLS label is inserted in the source address field or the destination address field. Rule 1, for instance, indicates that the MPLS label is to be inserted in the source field and rule 2 indicates that the MPLS label is to be inserted in the destination field. In some implementations, the MPLS label may be inserted in either the source address field or the destination address field, as indicated by rule 3 (VAR). This may mean that the insertion field may change based on the packet or based on other information, such as the network state. The particular location to use may be defined based on a deterministic technique, labeled as "[DEFINITION]" in FIG. 6. For example, the MPLS label may be inserted into a first of the source or destination address fields (e.g., the source field) when inserting a label into a packet that is to traverse a LSP in one direction and the MPLS label may be inserted into the other of the source or destination address fields (e.g., the destination field) when inserting a label into a packet that is to traverse the LSP in the other direction. In this manner, whether the MPLS label is in the source or destination address fields can be used to learn, by network devices, the "direction" that the packet is traveling relative to LSP. As another example of the particular location at which an MPLS label is inserted, if network device 200 inserts the MPLS label into the source IP address, network device 200 may flip the first bit located either to the left most or the right most of the inserted MPLS label. The first bit may be used to flag whether the label is inserted in the source IP address or the destination IP address.

Compression field 625 may indicate any additional processing that may be performed on the MPLS label and/or the source/destination address field in order to ensure address information is not overwritten in the source/destination fields. In some situations, compression field 625 may indicate additional processing is not necessary, such as in rule two and three. This situation may correspond to one in which the network configuration is known and it can be determined ahead of time that additional processing is not required. For example, for rule two, assume that the network administrator knows each of the possible source or destination IP packet addresses that may be placed in a LSP using the relevant labels for rule 2. Further, assume that none of these IP addresses uses bits 97-128 of the source address field (or all of the IP addresses have the same value for this field). In this situation, the MPLS label may be safely inserted at this location and no additional "compression" processing may be necessary. In other situations, additional processing may be necessary to ensure address information is not lost. For example, for rule label 1, compression field 625 is indicated as "YES", indicating that some compression may be necessary. In this case, field 625 may include additional information describing (or linking to) a specification of the compression technique.

Referring back to FIG. 5, the ingress and egress labels may be sorted (block 520). The labels may be sorted to allow for efficient processing of the labels by network device 200.

Packets may be received by network device 200. When there is a new packet to process, (block 530—YES), it may be determined whether the new packet is an ingress packet or an egress packet (block 540). An ingress packet may include a packet that is being placed into a LSP by network device 200. A packet may be determined to be a LSP ingress packet based on, for example, fields in header 320 of the packet. For example, packets destined for certain destination addresses or packets belonging to certain traffic flows may correspond to packets that are to be placed into a LSP, such as LSP 145. An egress packet may include a packet that was received by the network device over a LSP and is to be removed from the LSP by network device 200. Egress processing of a packet may generally include removing the MPLS label from the packet and forwarding the packet to its next network hop based on, for example, a lookup of the destination IP address in an IP table.

When the received packet is an ingress packet (block 540—YES), an MPLS label may be retrieved (block 550). For example, label embedding component 420 may retrieve the MPLS label appropriate for the packet and may process the packet to add a new MPLS label to the packet, enabling the packet to ingress to a next LSP. The MPLS label may be retrieved from the MPLS labels sorted in block 520. More particularly, label embedding component 420 may, for instance, determine the forward equivalence class (FEC) the packet should be in, which may determine the MPLS label(s) appropriate for the packet.

The label determined in block 550 may next be inserted into the packet (block 560). The label may be inserted into the source or destination IP address field of the packet based on the insertion rules that apply to the packet and/or the label (block 560). For example, assume that for a particular ingress packet, "rule 2" in table 600 is determined to apply to the MPLS label. In this case, the MPLS label may be embedded within the packet at bits 97-128 of destination IP address field 326.

The packet, including the embedded MPLS label, may next be output to MPLS label interface component 440 (block 570). MPLS label interface component 440 may serve as an interface for the next stage for processing of the packet within network device 200. For instance, MPLS label interface component 440 may handle forwarding of the packet to the output port of the network device corresponding to the embedded MPLS label. Alternatively, MPLS label interface component 440 may forward the packet to a next processing stage in network device 200. Although the "packet" was discussed above as being processed by label embedding component 420 and MPLS label interface component 440, these components may, in some implementations, operate on packet header or a portion of the packet header, where the payload and the packet header may be reunited at a later stage in network device 200 before transmission of the packet.

Referring back to block 540, when the received packet is an egress packet (block 540—NO), the MPLS label may be removed from the source and/or destination IP address field (block 580). For example, label extractor component 430 may remove the label according to the insertion rules so that the source/destination IP address is restored to its original value. For example, for certain insertion rules, the replaced portion of the source and/or destination portion of the IP address may be a section of the address in which all the packets in the LSP have the same value for this section of the address. In this situation, label extractor component 430 may substitute the value into the address and the substitution to perform may be specified in, for example, compression field 625 for the insertion rule. Alternatively, in some implementations, the network administrator may determine that the section of IP address used for the MPLS may not be needed to deliver the packet to its end-destination, and accordingly, the MPLS label may be left in the IP address.

The packet may next be output to MPLS label interface component 440 (block 590). MPLS label interface component 440 may serve as an interface for the next stage for processing of the packet within network device 200. For instance, MPLS label interface component 440 may handle forwarding of the packet to the output port of the network device corresponding the embedded MPLS label. Alternatively, MPLS label interface component 440 may forward the packet to a next processing stage in network device 200. Although the "packet" was discussed above as being processed by label extractor component 430 and MPLS label interface component 440, these components may, in some implementations, operate on packet header or a portion of the packet header, where the payload and the packet header may be reunited at a later stage in network device 200 before transmission of the packet.

The description described above with respect to FIG. 5 may be applicable to LERs, such as edge routers 1301-1 and 130-2, in an MPLS network. Intermediate network devices, such as core routers 135, may process the received packets by examining the source IP address and destination IP address to determine if a MPLS label is present in the source IP address or destination IP address and forward the packets to an output port based on the labels, if any. Other techniques through which a core router 135 may determine that a particular packet is an MPLS packet may be used. For example, instead of pre-pending a "full" 32-bit MPLS label to a packet, the LERs may append a shorter MPLS field to a packet. The shorter MPLS field may be, for example, a flag that indicates whether (and potentially where) an MPLS label is embedded in the packet address fields.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIG. 5, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a network device, a packet;
    determining, by the network device, whether the packet is an ingress packet or an egress packet for a multiprotocol label switching (MPLS) label-switched path (LSP);
    determining, by the network device, a first MPLS label for the packet when the packet is the ingress packet;
    inserting, by the network device and when the packet is the ingress packet, a first portion of the first MPLS label into a source internet protocol (IP) address field of a header of the packet and a second portion of the first MPLS label into a destination IP address field of the header of the packet;
    removing, by the network device and when the packet is the egress packet, a second MPLS label from one or more of:
       the source IP address field, or
       the destination IP address field; and
    outputting the packet.

2. The method of claim 1, where inserting the first portion of the first MPLS label into the source IP address field includes:
    modifying a particular bit to indicate that the first portion of the first MPLS label is inserted into the source IP address field.

3. The method of claim 1, where the packet is an Internet Protocol version 6 (IPv6) packet, the method further comprising:
    identifying a section of the source IP address field that is common to packets transmitted via the LSP; and
    where inserting the first portion of the first MPLS label includes:
       replacing the section of the source IP address field with the first portion of the first MPLS label.

4. The method of claim 1, where the network device determines the first MPLS label for the packet based on a forward equivalency class (FEC) of the packet.

5. The method of claim 1, further comprising:
    identifying, based on the first MPLS label, one or more rules that define how MPLS labels are to be included in packet headers.

6. The method of claim 5, where the one or more rules include one or more of:
    one or more rules that define MPLS labels which are to be inserted in to the source IP address field or the destination IP address field,
    one or more rules that define a location in the source IP address field or a location in the destination IP address field at which the MPLS labels are to be inserted, or
    one or more rules that determine which of the source IP address field or the destination IP address field the MPLS labels are to be inserted in.

7. The method of claim 5, further comprising:
    transmitting the one or more rules using a network discovery protocol to distribute the one or more rules to other network devices associated with the LSP.

8. The method of claim 1, where the network device is a label edge router (LER).

9. A network device comprising:
    one or more processors to:
       receive and store multiprotocol label switching (MPLS) labels that are to be used to create MPLS label switched paths (LSPs) in a network,
       when a packet received by the network device is a packet that is to ingress into a first MPLS LSP, insert a first portion of a first MPLS label, of the MPLS labels, in a portion of a source internet protocol (IP) address field of the packet and a second portion of the first MPLS label in a portion of a destination IP address field of the packet, and
       when the packet received by the network device is a packet that egresses from a second MPLS LSP, remove one or more MPLS labels from one or more of:
          the source IP address field of the packet, or
          the destination IP address field of the packet.

10. The network device of claim 9, where the first MPLS label is determined based on a forward equivalency class (FEC) of the packet.

11. The network device of claim 9, where the packet is an Protocol version 6 (IPv6) packet.

12. The network device of claim 9, where the one or more processors are further to:
    identify one or more insertion rules based on the first MPLS label, the one or more insertion rules defining how MPLS labels are to be inserted into the one or more of the source IP address field or the destination IP address field.

13. The network device of claim 12, where the one or more insertion rules include:
    one or more rules that define MPLS labels which are to be inserted in to the source IP address field,
    one or more rules that define MPLS labels which are to be inserted in to the destination IP address field, or
    one or more rules that define a location in the source IP address field or the destination IP address field at which the MPLS labels are to be inserted.

14. The network device of claim 9, where the network device includes a switch or a router.

15. A method, comprising:
receiving, by a network device, a packet;
determining, by the network device, whether the packet is egressing from a multiprotocol label switching (MPLS) label-switched path (LSP);
removing, by the network device and when the packet is determined to be egressing from the MPLS LSP, a first portion of an MPLS label that was inserted into a portion of a source internet protocol (IP) address field of a header of the packet and a second portion of the MPLS label that was inserted into a portion of a destination IP address field of the header of the packet; and
outputting, by the network device, the packet based on removing first portion of the MPLS label and the second portion of the MPLS label.

16. The method of claim 15, where the packet is an Internet Protocol version 6 (IPv6) packet.

17. The method of claim 15, further comprising:
determining to remove the first portion of the MPLS label from the source IP address field based on a plurality of rules that define how MPLS labels are to be removed from the source IP address field or the destination IP address field.

18. The method of claim 17, where the plurality of rules include one or more rules defining:
a location in the source IP address field or a location in the destination IP address field from which the MPLS label is to be removed.

19. A network device comprising:
a memory to store a plurality of instructions; and
a processor to execute instructions in the memory to:
receive a packet;
determine whether the packet is an ingress packet for a multiprotocol label switching (MPLS) label-switched path (LSP) or an egress packet for the MPLS LSP;
determine a first MPLS label for the packet when the packet is an ingress packet;
insert, when the packet is the ingress packet, a first portion of the first MPLS label in a portion of a source internet protocol (IP) address field of the packet and a second portion of the first MPLS label in a portion of a destination IP address field of the packet;
remove, when the packet is the egress packet, a second MPLS label from one or more of:
the portion of the source IP address field, or
the portion of the destination IP address field; and
output the packet.

* * * * *